United States Patent [19]

Robers

[11] 4,300,162
[45] Nov. 10, 1981

[54] FIELD INTERPOLATION CIRCUIT

[75] Inventor: Klass H. J. Robers, Eindhoven, Netherlands

[73] Assignee: U.S. Philips Corporation, New York, N.Y.

[21] Appl. No.: 111,137

[22] Filed: Jan. 10, 1980

[30] Foreign Application Priority Data

Jan. 16, 1979 [NL] Netherlands .................... 7900324

[51] Int. Cl.³ .............................................. H04N 5/14
[52] U.S. Cl. .................................. 358/160; 358/167; 358/138
[58] Field of Search ............... 358/160, 166, 167, 133, 358/138

[56] References Cited

U.S. PATENT DOCUMENTS 2,921,124 1/1960 Graham ........................... 358/138

Primary Examiner—Richard Murray
Attorney, Agent, or Firm—Thomas A. Briody; William J. Streeter; Edward W. Goodman

[57] ABSTRACT

In an interlaced television system wobbling and flicker effects can be prevented from occurring on display by the use of an extrapolation circuit which repeats a preceding field in a next field period in such positions and with such brightnesses that the average position and brightness of the repeated fields are identical to those of the preceding field.

4 Claims, 5 Drawing Figures

FIELD INTERPOLATION CIRCUIT

BACKGROUND OF THE INVENTION

The invention relates to a field interpolation circuit for combining signals corresponding to signals from consecutive fields of an original picture into an interpolated signal in such an amplitude ratio that in a picture to be displayed by means of this interpolated signal the sum of the luminous intensities to be caused by signals corresponding to signals from a plurality of lines of the picture to be displayed, these lines being obtained by the field interpolation circuit, instead of a signal from a line of the original picture, is substantially the same for every field.

The Netherland's Patent Application No. 7706512 (PHN 8821) discloses a field interpolation circuit of the above-mentioned type with which disturbing effects, which are the result of motions in the picture when the number of lines is doubled while maintaining the field frequency, are reduced.

SUMMARY OF THE INVENTION

It is an object of the invention to prevent other disturbing phenomena, such as flickering, occuring in interlaced pictures, and wobbling of certain types of pictures to be displayed, such as pictures generated by, for example, character generators or writing platen from occurring.

According to the invention, a field interpolation circuit of the type mentioned in the opening paragraph is characterized in that the amplitude ratio is such that, in a picture to be displayed by means of the interpolated signal, in a group of lines corresponding to a line of the original picture over which group the signals obtained instead of a signal from a line of the original picture are distributed by means of the field interpolation circuit, the sum of the product of the luminance and the distance of the lines of the group to the center of that group is substantially zero for each field.

The invention is based on the recognition that an interpolation circuit can be used for extrapolation. Namely, when a field interpolation circuit is used, signals from one field are also displayed in the next field. If this occurs a few times, shifted one line period in that next field, then there are displayed in that next field some pictures which are somewhat shifted in the vertical direction relative to that picture or those pictures in the preceding field. When these shifted pictures are displayed below and above that picture or those pictures of the preceding field and when the luminances are chosen so that the eye gets the impression that the average position of these pictures in the next field coincides with that of the preceding field, wobbling of contours is prevented by this extrapolation. If, furthermore, the luminances of these pictures, which are averaged by the eye, are the same in the two consecutive fields, flicker effects are no longer produced at these contours.

In addition, this interpolation is of such a form that contours in the vertical direction become somewhat less sharp. If, in accordance with a further elaboration of the invention the contours are also made somewhat less sharp in the horizontal direction by means of a dot interpolation circuit, the contours are displayed in a pleasing manner, an additional advantage being that on the display of graphic display signals thin, substantially horizontal lines no longer make a fragmentary impression and that no rounding is required anymore for the display of character picture signals such as in teletext or view-data systems.

DESCRIPTION OF THE DRAWINGS

The invention will now be explained in greater detail with reference to the drawings.

In the drawings.

DESCRIPTION OF THE PREFERRED EMBODIMENTS

Figure 1:
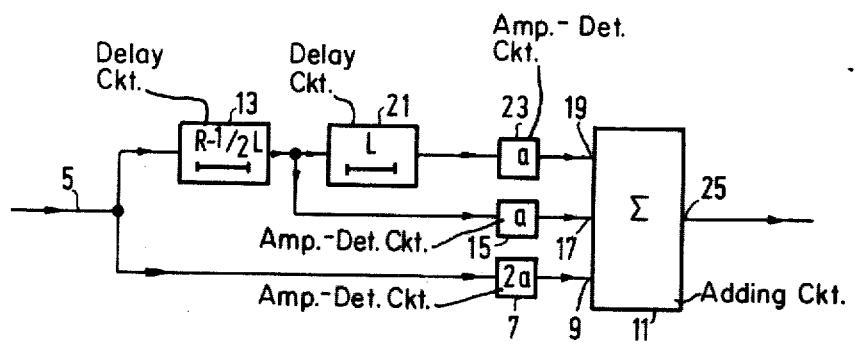
FIG. 1 illustrates by means of a block diagram a possible embodiment of a field interpolation circuit according to the invention.

In FIG. 1 a twofold interlaced video signal having, for example, a field frequency of 50 Hz and a line frequency of 15,625 Hz is applied to an input 5 of the field interpolation circuit. This video signal is applied to an input 9 of an adding circuit 11 via an amplitude-determining circuit 7, such as an amplifier or an attenuator. Furthermore, this video signal is applied to a second input 17 of the adding circuit 11 via a delay circuit 13 having a time delay equal to a field period less half a line period $(R - \frac{1}{2}L)$, and an amplitude-determining circuit 15. A third inpt 19 of the adding circuit 11 receives the video signal via the delay circuit 13, a delay circuit 21 having a time delay of one line period (L), and an amplitude-determining circuit 23. At an output 25 of the adding circuit 11 there now appears a video signal which, in a picture display device, displays three times an original field in the manner this field would be displayed by the input signal, namely a first time corresponding to the time and the position of the original field and with a brightness 2a determined by the amplitude-determining circuit 7, a second time and a next field period with a brightness a determined by the amplitude-determining circuit 15 in a position slightly above that of the original field and a third time in that same, next field period with a brightness a determined by the amplitude-determining circuit 23 in a position somewhat lower than that of the original field. The average position and the combined brightnesses of the two last-mentioned displayed fields correspond, however, to those of the first-mentioned field, flicker and wobble phenomena thus being prevented from occurring. Namely, with an interlaced picture these phenomena are caused by the fact that a picture element having a certain brightness and position in a first field does not occupy the same position in the second field, it therefore having a zero brightness in situ of the first-mentioned picture element. This does not occur with a circuit according to the invention.

Figure 2:
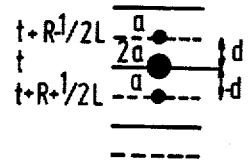
FIG. 2 shows a portion of a picture obtained by means of a field interpolation circuit shown in FIG. 1.

The operation of the circuit shown in FIG. 1 will be explained with reference to FIG. 2. This figure shows schematically a small portion of an interlaced picture displayed by means of the circuit shown in FIG. 1, lines of a first field being shown by means of solid lines and lines of the next field by means of dotted lines. A picture element having a brightness 2a occurring at an instant t in the first field is repeated in the next field with a brightness a at an instant t+(R−½L) and is repeated again with a brightness a at an instant t+(R+½L). A group of three lines is produced wherein a picture element from the original video signals occurs in the picture displayed by means of the interpolated video signal. The center of this group coincides with the line through the picture element which is displayed at the instant t. The sum of brightness in this group of lines is equal to 2a in the first field and equal to a+a and, consequently, also equal to 2a in the second field. The distance of the picture element in the first field from the center is zero and, consequently, also the product of that distance and the brightness. In the second field the product of brightness and distance to the center of the picture element at the instant t+(R−½L) is equal to da and of the picture element at the instant t+R+½L is equal to −da. The sum of these products is da−da=0. So this sum is zero in each field.

Figure 3:
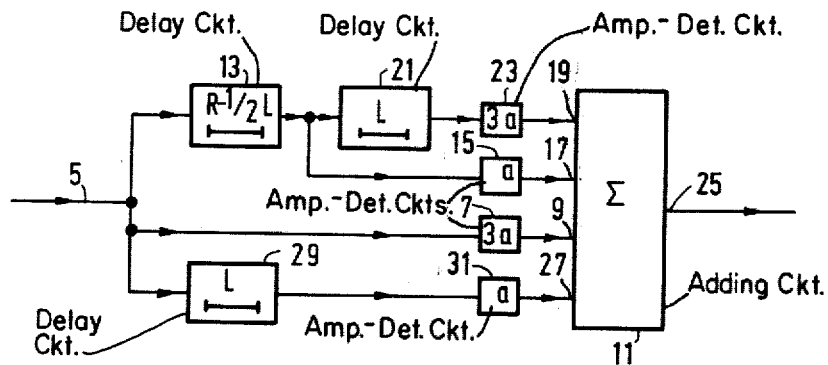
FIG. 3 illustrates by means of a block diagram another field interpolation circuit according to the invention.

Elements of the field interpolation circuit for a double interlaced video signal in FIG. 3 which correspond to elements in FIG. 1 have been given the same reference numerals. The adding circuit 11 now has a fourth input 27 to which the video signal received at the input 5 is applied via a delay circuit 29 having a time delay of one line period (L) and an amplitude-determining circuit 31.

Figure 4:
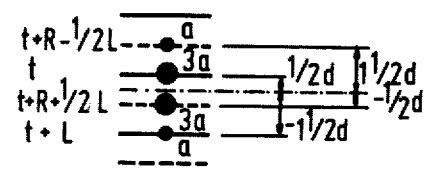
FIG. 4 shows a portion of a picture obtained by means of a field interpolation circuit shown in FIG. 3.

In this case the amplitude-determining circuits produce brightnesses in the displayed picture as shown in FIG. 4, which corresponds to FIG. 3 in all further respects, this brightness being for a picture element at the instant t equal to 3a, at the instant t+L equal to a, at the instant t+R−½L equal to a and at the instant t+R+½L equal to 3a. These picture elements correspond with a single picture element which would be obtained at the instant t by means of the original video signal, which is applied to the input 5. The group of lines over which this picture element is now distributed has a center which is indicated by means of a dot - and - dash line. The instants t and t+L occur in the first field and the instant t+R−½L and t+R+½L occur in the second field. The sum of brightnesses in the first field is 3a+a=4a and the sum of brightnesses in the second field is a+3a=4a. These sums are equal. In the first field the product of the brightnesses and the distance to the center are ½d. 3a and −1½d. a. The sum thereof is zero. In the second field these products are 1½d. a and −½d. 3a, the sum of which is also zero. So in both fields the average position of the picture elements is located in the center of said group of lines and the average brightness of the picture elements is the same.

When the display device with which the output signal of the interpolation circuit is displayed has a non-linear characteristic (γ≠1), the amplitude-determining circuit must cause an adapted amplitude ratio $$\sqrt[\gamma]{2a} : \sqrt[\gamma]{a}$$

in the case of FIG. 1, and of $$\sqrt[\gamma]{3a} : \sqrt[\gamma]{a}$$

in the case of FIG. 3, so that the above-mentioned conditions for the picture element brightness is satisfied, small deviations from the ideal values of course being permissible, which also applies to the shown embodiments.

If a multiple interlaced picture must be displayed which requires more than two fields for a complete television picture, the interpolation circuit must be adapted along the lines of the principles described above by an interpolation over those rasters and a suitable number of lines.

It is of course possible to interpolate in the above-described manner over more fields than necessary for a complete television picture.

The delay circuits used may comprise analog or digital delay services. In the latter case, analog-to-digital and digital-to-analog converters can be used for adapting the television signal to the delay device and to the picture display device.

In general, interpolation circuits according to the invention will be used when video signal generation devices are used which can generate very abrupt brightness transitions into the vertical direction, such as writing platen and character generators. It is often possible to avoid the use of the delay devices in such video signal generators by using read-out refinements of stores, as will be explained in the embodiment of FIG. 5.

Figure 5:
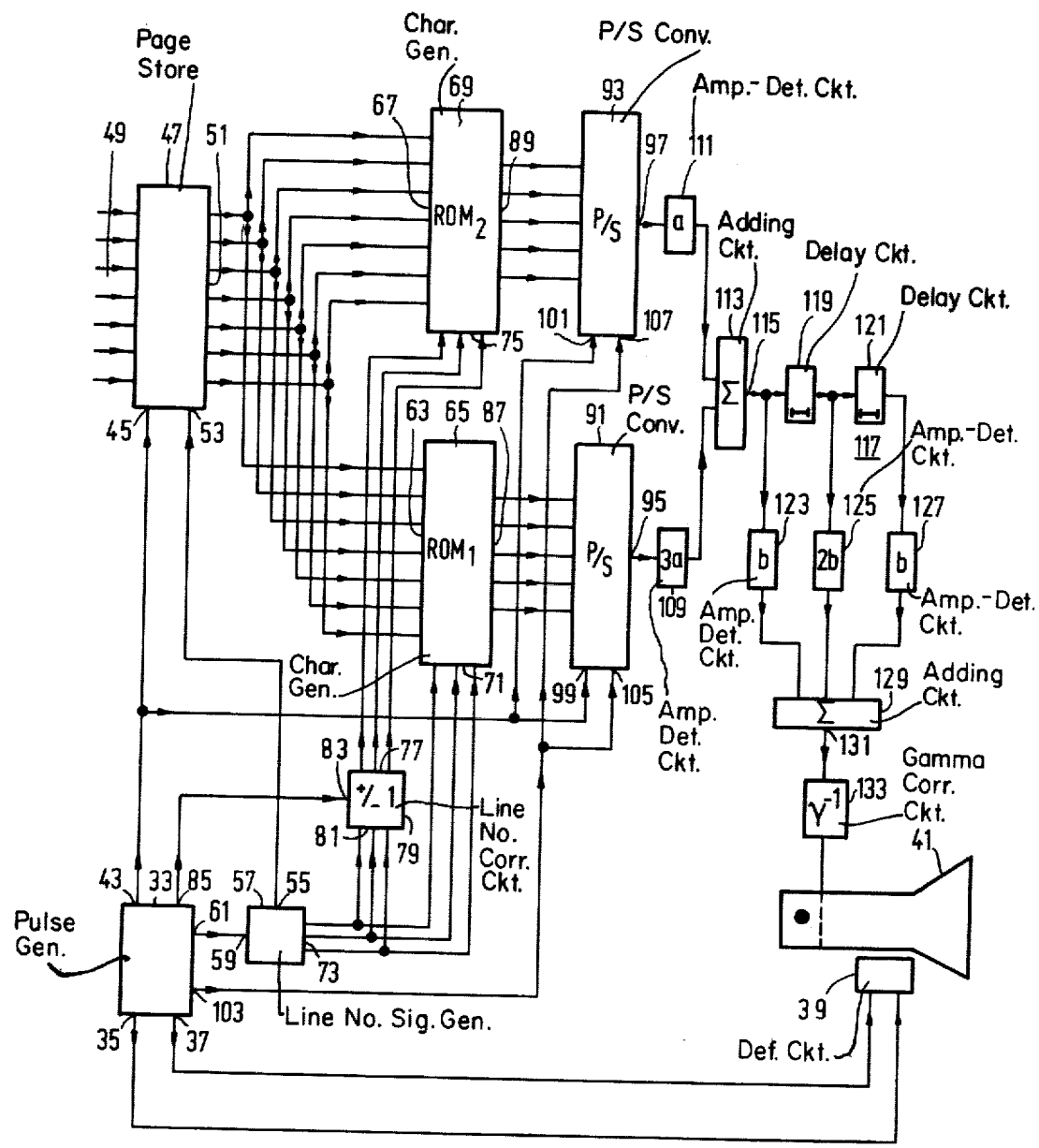
FIG. 5 illustrates by means of a block diagram a character display device having an interpolation circuit according to the invention.

FIG. 5 shows a schematic block diagram of a character display device suitable for teletext or view-data uses.

A pulse generator 33 produces a pulse signal of the line frequency at an output 35 and a pulse signal of the field frequency at an output 37. These signals are applied to a deflection circuit 39, which so deflects an electron beam of a picture display tube that an interlaced picture is produced.

The pulse generator 33 supplies further a new-character signal to an input 45 of a page store 47 via an output 43. This page store 47 is assumed to have been written-in via a group of inputs 49 and supplies a new group of character code signals to a group of outputs 51 at each occurrence of a new-character signal. The characters are arranged in lines and at the beginning of a new line a new-line signal is applied to an input 53 of the page store 47. This new-line signal is received from an output 55 of a line number signal generator 57. This line number signal generator 57 is controlled by means of an input 59 by a new-line signal received from an output 61 of the pulse signal generator 33.

The group of character code signals occurring at the group of outputs 51 of the page store 47 is applied to a group of inputs 63 of a first character generator (ROM 1) 65 and to a group of inputs 67 of a second character generator (ROM 2) 69. At a group of inputs 71 the first character generator 65 receives a line number signal group received from a group of outputs 73 of the line number signal generator 57. At a group of inputs 75 the second character generator 69 receives a line number signal group received from a group of outputs 77 of a line number correction circuit 79. This line number correction circuit converts a line number signal group received at a group of inputs 81 into a signal group associated with a line number which, in one field, is one higher than the line number associated with the line number group applied to the input and which is one lower in the next field. This is controlled by a signal applied to an input 83 thereof which signal is received from an output 85 of the pulse signal generator 33 and indicates whether the field to be displayed on the picture display tube 41 is even or odd.

The character generators 65 and 69, respectively, produce at a group of outputs 87 and 89, respectively, a group of video signals associated with the line number, determined by the line number signal group at the group of inputs 71 and 75, respectively, of a character determined by the group of character code signals at the group of inputs 63 and 67, respectively. Parallel-series converters 91 and 93, respectively, convert these groups of video signals into video signals suitable for display and produced at output 95 and 97, respectively. This is controlled by the new-character signal received from the output 43 of the pulse signal generator 33, which signal is applied to inputs 99 and 101, respectively, and a clock signal received from an output 103 of the pulse generator 33, which is applied to inputs 105 and 107, respectively.

The video signal at the outputs 95 and 97, respectively, of the parallel-series converters 91 and 93, respectively, are applied in an amplitude ratio $3a$:$a$ to an adding circuit 113 via amplitude-determining circuits 109 and 111, respectively. Now the adding circuit 113 produces a video signal at an output 115 in response to which a picture element of a character would be displayed in the manner shown in FIG. 4. This video signal is applied to a dot interpolation circuit 117, which comprises two series-arranged delay circuits 119, 121, which each delay the video signal for a period of time corresponding to a picture element. To an adding circuit 129 there are supplied, for example in an amplitude ratio $b$:$2b$:$b$, the output signal of the adding circuit via an amplitude-determining circuit 123, the output signal of the delay circuit 119 via an amplitude-determining circuit 125 and that of the delay circuit 121 via an amplitude-determining circuit 127. From an output 131 of the adding circuit 129, which is also the output of the dot interpolation circuit 117, a video signal is now obtained which is repeated a number of times also in the horizontal direction, so that the abruptness of horizontal brightness transients is adapted to that of vertical brightness transients and the characters to be displayed get a pleasing shape, which makes a character rounding circuit superfluous.

The video signal at the output 131 of the adding circuit 129 is applied to a control electrode of the picture display tube 41 via a $\gamma$-correction circuit 133.

The element delay circuits 119, 121 can be constructed as digital circuits if they are arranged before the amplitude-determining circuits 111 and 109. The amplitude-determining circuits 109, 111, 123, 125 and 127 and the adding circuits 113 and 129 can then be formed by a matrix. If the parallel-series converters 91 and 93 have a number of outputs at which a picture element of signals, which are shifted relative to each other, occur, the element delay functions can be performed by these converters.

It will be apparent that also when, for example, a writing platen is used for the generation of a video signal, a line number correction circuit can be used in a similar manner as described above for the text picture display device.

For color rendition each one of the character generators 65 and 69 has three output circuits with an output for each color, a circuit which is identical to the circuit denoted by reference numerals 109 to 133, inclusive, being used for each color.

A field interpolation circuit according to the invention can not only be used to good effect at the receiving end of an interlaced television system but also at the transmitting end, for example, when sub-titles are generated digitally.

A field interpolation circuit according to the invention can also be used to display facsimile pictures on interlaced picture display devices, it then also being possible to use read refinements of stores, as for the embodiment of FIG. 5, instead of delay circuits.

I claim:

1. A field interpolation circuit for combining signals corresponding to signals from consecutive fields of an original picture with an interpolated signal in such an amplitude ratio that in a picture to be displayed by means of this interpolated signal, the sum of the brightnesses to be produced by signals corresponding to signals from a plurality of lines of the picture to be displayed, these signals being obtained by the field interpolation circuit instead of a signal from a line of the original picture, is substantially the same for every field, characterized in that said field interpolation circuit comprises an input for receiving video signals, a first and a second means for delaying video signals serially coupled to said input, an adding circuit, and means for applying to said adding circuit in a predetermined ratio the video signals as applied to said input, the output of said first delaying means and the output of said second delaying means, the output of said adding circuit forming the output of said field interpolation circuit.

2. A field interpolation circuit as claimed in claim 1, wherein said first delaying means has a delay time equal to one field period less one-half line period and said second delaying means has a delay time equal to one line period and wherein said predetermined ratio of said applying means is 2:1:1, respectively.

3. A field interpolation circuit as claimed in claim 2, characterized in that it also comprises a dot interpolation circuit.

4. A field interpolation circuit as claimed in claim 1 or 2, characterized in that it further comprises a line number correction circuit.

* * * * *